D. Cole,
Trap.
No. 99,537.   Patented Feb. 8, 1870.

Witnesses:
Jesse G. Thompson
James Clarkson

Inventor
Daniel Cole

United States Patent Office.

DANIEL COLE, OF SCOTT TOWNSHIP, PENNSYLVANIA.

Letters Patent No. 99,537, dated February 8, 1870.

IMPROVED TRAP.

The Schedule referred to in these Letters Patent and making part of the same.

*To whom it may concern:*

Be it known that I, DANIEL COLE, of the township of Scott, county of Luzerne, and State of Pennsylvania, have invented a new and improved Cage-Trap for catching animals, fish, birds, and insects; and I do hereby declare that the following is a full and exact description thereof, reference being had to the accompanying drawings, and the letters of reference marked thereon, of which—

To enable others skilled in the art to make and use my invention, I will proceed to describe its construction and operation.

Figure 1:
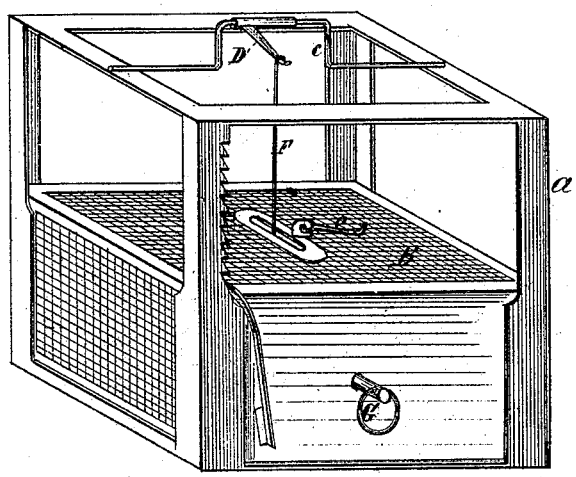
Figure 1 is a cage-trap, with the cage resting on the floor of the frame.
Figure 3:
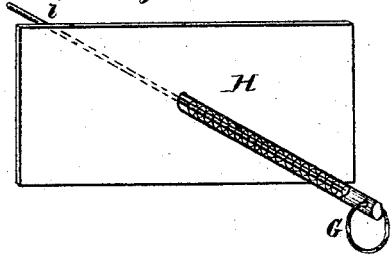
Figure 3 represents a slide-scraper, and the rod on which it slides passing into a tube, with ring, by which the scraper is moved back and forward across the cage.

I construct the square frame $a$, as shown in fig. 1, of wood or other material, and of any required size, with the elevated rod $c$, fastened across the top.

On the elevated part of rod $c$, I fix a rolling thimble, with arm D made fast to thimble, into which wire F is fastened, extending down into the cage; and in the bottom of frame $a$ I make a smooth level floor, over which I place a perforated plate designed to cover molasses or other like bait, and enable insects to eat it through the holes in the plate, without getting their feet stuck fast in the bait.

Figure 2:
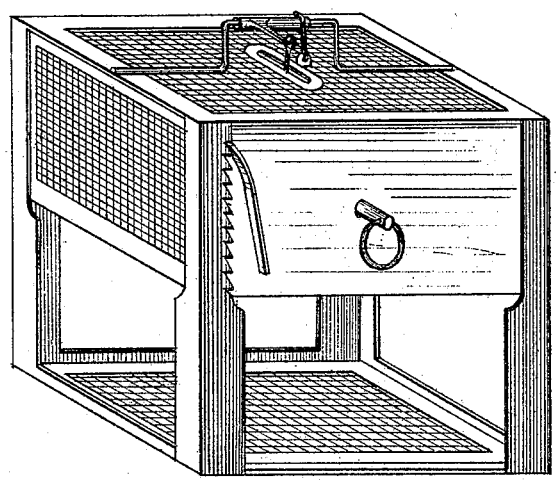
Figure 2 is also a full representation of my cage-trap, when set for game.

I construct cage B, of tin, sheet-iron, or other metal, of a size suitable to fit inside of frame $a$, and about half its height, with two sides and top perforated, if not made of wire, with a hole in the top to let wire F pass through, on which I fasten the bait for the larger animals and fish. I raise the cage to the top of frame $a$, and hook it on to rolling thimble that is attached to arm D, by means of hook $e$, linked to top of cage B, as represented in fig. 2, which allows animals and fish to pass in under the cage to the bait, the slightest pull upon which springs the trap, lets down the cage, and secures the game; and to prevent the cage from being raised, I fix dog $j$ on the outside of cage B, to fasten in notches made in the edge of post of frame $a$.

For catching and killing insects, I place molasses or other bait on the floor of frame $a$, and cover it with the perforated plate, and when there is a sufficient number of insects collected, I spring the trap with a string. I fasten rod $i$, by one end, to the back of the cage, with the other end extending through the cage to near the front, upon which slides the slide-scraper H, attached to which are tube and ring G. I pull slide-scraper forward, and kill the insects against the front of the cage.

What I claim as my invention, and desire to secure by Letters Patent, is—

The construction of cage-trap B, inside of frame $a$, the rolling thimble and arm D, made and used as herein described and for the purpose set forth.

DANIEL COLE.

Witnesses:
    JESSE G. THOMPSON,
    JAMES CLARKSON.